(12) United States Patent
McInnis et al.

(10) Patent No.: US 10,452,054 B2
(45) Date of Patent: Oct. 22, 2019

(54) METHODS AND SYSTEMS FOR RETAIL CUSTOMIZABLE FOOTWEAR COMPONENTS

(71) Applicant: Reebok International Limited, London (GB)

(72) Inventors: William McInnis, Westwood, MA (US); Robert Rich, Westwood, MA (US)

(73) Assignee: Reebok International Limited, London (GB)

( * ) Notice: Subject to any disclaimer, the term of this patent is extended or adjusted under 35 U.S.C. 154(b) by 194 days.

(21) Appl. No.: 15/449,642

(22) Filed: Mar. 3, 2017

(65) Prior Publication Data

US 2018/0253079 A1 Sep. 6, 2018

(51) Int. Cl.
| | | |
|---|---|---|
| *A43D 1/00* | (2006.01) | |
| *G05B 19/4099* | (2006.01) | |
| *A43D 1/02* | (2006.01) | |
| *A43D 3/02* | (2006.01) | |
| *A43B 17/00* | (2006.01) | |
| *A43B 7/14* | (2006.01) | |
| *B33Y 10/00* | (2015.01) | |
| *B33Y 30/00* | (2015.01) | |
| *B33Y 50/02* | (2015.01) | |

(Continued)

(52) U.S. Cl.
CPC .......... *G05B 19/4099* (2013.01); *A43B 7/141* (2013.01); *A43B 7/142* (2013.01); *A43B 17/00* (2013.01); *A43D 1/025* (2013.01); *A43D 3/02* (2013.01); *B29C 64/386* (2017.08); *B33Y 10/00* (2014.12); *B33Y 30/00* (2014.12); *B33Y 50/00* (2014.12); *B33Y 50/02* (2014.12); *B33Y 80/00* (2014.12); *G05B 19/4207* (2013.01); *B29L 2031/504* (2013.01); *G05B 2219/45243* (2013.01); *G05B 2219/49007* (2013.01); *G05B 2219/49023* (2013.01)

(58) Field of Classification Search
USPC ........................................................ 156/64
See application file for complete search history.

(56) References Cited

U.S. PATENT DOCUMENTS

| | | |
|---|---|---|
| 2007/0039209 A1 | 2/2007 | White et al. |
| 2008/0292179 A1 | 11/2008 | Busch |

(Continued)

FOREIGN PATENT DOCUMENTS

| | | |
|---|---|---|
| WO | WO 2014/014977 A2 | 1/2014 |
| WO | WO 2014/100824 A1 | 6/2014 |

(Continued)

*Primary Examiner* — Jeffry H Aftergut
(74) *Attorney, Agent, or Firm* — Sterne, Kessler, Goldstein & Fox P.L.L.C.

(57) ABSTRACT

A method of making an arch support for an article of footwear at a kiosk includes scanning a foot of a customer who has selected a shoe for purchase, determining dimensions of the customer's foot based on the scan, comparing the dimensions of the customer's foot with pre-determined dimensions of a last used to make the selected shoe, defining a shape characterized by the difference between the dimensions of the customer's foot and the dimensions of the last, and printing the arch support with a 3D printer. The arch support has the shape characterized by the difference between the dimensions of the customer's foot and the dimensions of the last.

16 Claims, 11 Drawing Sheets

(51) Int. Cl.
*B33Y 80/00* (2015.01)
*B29C 64/386* (2017.01)
*B33Y 50/00* (2015.01)
*G05B 19/42* (2006.01)
*B29L 31/50* (2006.01)

(56) References Cited

U.S. PATENT DOCUMENTS

| | | |
|---|---|---|
| 2014/0285646 A1 | 9/2014 | Kahlon |
| 2016/0125499 A1 | 5/2016 | Gooch et al. |
| 2017/0055629 A1* | 3/2017 | Schickling ............ A43B 7/1445 |
| 2017/0255185 A1* | 9/2017 | Hinshaw .................. A43B 1/00 |
| 2017/0308945 A1* | 10/2017 | Loveder ............. G06Q 30/0621 |

FOREIGN PATENT DOCUMENTS

| | | |
|---|---|---|
| WO | WO 2015/169942 A1 | 11/2015 |
| WO | WO-2017/182930 A2 * | 10/2017 |

* cited by examiner

METHODS AND SYSTEMS FOR RETAIL CUSTOMIZABLE FOOTWEAR COMPONENTS

BACKGROUND OF THE INVENTION

Field of the Invention

Embodiments of the present invention relate generally to methods and systems for retail customizable articles of footwear; and more specifically to methods and systems for making custom footwear components to customize articles of footwear in a retail setting.

Background

Throughout the course of an average day, the feet and legs of an individual are subjected to substantial amounts of impact forces. Footwear plays an important role in mitigating many of these forces. Inadequately supported and improperly fit footwear can lead to injuries such as blisters; muscle, tendon and ligament damage; and bone stress fractures. Improper footwear can also lead to other ailments, including back pain.

Proper footwear should complement the natural functionality of the foot, in part, by incorporating a sole (typically including an outsole, midsole, and insole) that supports the foot within the footwear. Providing appropriate support and fit for the foot to complement its natural functionality can reduce the risk of injury and discomfort. Moreover, because human feet vary from person to person, even within a particular shoe size, a standard shoe will not always provide the best fit for each individual. Therefore, a continuing need exists for innovations in shoes that provide the wearer's foot with optimal fit and support.

BRIEF SUMMARY OF THE INVENTION

Methods and systems for making custom footwear components to customize articles of footwear in a retail setting are disclosed. In some embodiments, a method of making a medial longitudinal arch support for an article of footwear at a kiosk includes scanning a foot of a customer who has selected a shoe for purchase, determining dimensions of the customer's foot based on the scan, comparing the dimensions of the customer's foot with pre-determined dimensions of a last used to make the selected shoe, defining a shape characterized by the difference between the dimensions of the customer's foot and the dimensions of the last, and printing the arch support with a 3D printer. In some embodiments, the arch support has the shape characterized by the difference between the dimensions of the customer's foot and the dimensions of the last.

In some embodiments, the method also includes creating a three dimensional virtual model of the customer's foot. In some embodiments, the method also includes printing a three dimensional model of the customer's foot with the 3D printer.

In some embodiments, the arch support is printed in less than ten minutes. In some embodiments, the dimensions of the customer's foot include foot length, ball girth circumference, foot breadth, instep circumference, heel breadth, medial arch length, instep length, fibular instep length, height of top of ball girth, height of instep, and toe angles. In some embodiments, the dimensions of the last are provided by a manufacturer of the selected shoe and stored in a database. In some embodiments, comparing the dimensions of the customer's foot with the dimensions of the last includes comparing the dimensions of the customer's foot with the dimensions of the last in the arch area.

In some embodiments, a method of providing a customized article of footwear includes obtaining foot dimensions of a customer at a kiosk, comparing the foot dimensions with pre-determined dimensions of an article of footwear selected by the customer, 3D printing a customized arch support having a shape that matches a difference between the foot dimensions and the dimensions of the article of footwear, attaching the customized arch support to a flat insole, and inserting the flat insole and the customized arch support into the article of footwear.

In some embodiments, the customized arch support is attached to a bottom surface of the flat insole. In some embodiments, the customized arch support and the flat insole form a custom footbed within the article of footwear.

In some embodiments, obtaining the foot dimensions of the customer includes measuring the customer's foot with a 3D scanner. In some embodiments, the dimensions of the article of footwear are stored in a database provided by a manufacturer of the article of footwear. In some embodiments, comparing the foot dimensions with the dimensions of the article of footwear includes comparing a three dimensional virtual model of the customer's foot with a three dimensional virtual model of a last used to make the article of footwear.

In some embodiments, the customized arch support is attached to the flat insole via an adhesive.

In some embodiments, a system for customizing an article of footwear includes a 3D scanner, a database, a computing device, and a 3D printer. In some embodiments, the 3D scanner can scan a foot of a customer. In some embodiments, the database contains shoe dimension information of shoes offered for sale. In some embodiments, the computing device can determine foot dimension information based on the scan of the foot and can compare the foot dimension information with shoe dimension information of a shoe selected by the customer. In some embodiments, the 3D printer can print an arch support based on the comparison of the foot dimension information and the shoe dimension information of the shoe selected by the customer. In some embodiments, the arch support can be attached to an insole and inserted within the shoe to make a customized article of footwear.

In some embodiments, the 3D scanner and the 3D printer are located in a kiosk. In some embodiments, the shoe dimension information includes dimensions of a last used to build the shoe. In some embodiments, the computing device can create a three dimensional virtual model of the foot. In some embodiments, the system also includes a display screen that can display the foot dimension information. In some embodiments, the 3D printer can print a three dimensional model of the foot.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

The present invention will now be described in detail with reference to embodiments thereof as illustrated in the accompanying drawings, in which like reference numerals are used to indicate identical or functionally similar elements. References to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "invention" or "present invention" as used herein is a non-limiting term and is not intended to refer to any single embodiment of the particular invention but encompasses all possible embodiments as described in the application.

The following examples are illustrative, but not limiting, of the present invention. Other suitable modifications and adaptations of the variety of conditions and parameters normally encountered in the field, and which would be apparent to those skilled in the art, are within the spirit and scope of the invention.

Embodiments of the present invention provide methods and systems for retail customizable articles of footwear. Characteristics of a human foot vary for each individual, including the characteristics of an individual's arch. Thus, while articles of footwear may come in different sizes, the various sizes alone do not account for the unique characteristics (e.g., the unique arch) of each individual. The unique characteristics may depend on individual anatomy, arch mobility, and/or personal preference or perception. A custom-made article of footwear may provide better fit and support for the wearer, but providing a custom-made article of footwear can be costly and time-consuming for manufacturers. Moreover, consumers may be more interested in quickly obtaining a pair of shoes than waiting for and/or paying for a manufacturer to produce a custom-made article of footwear. Accordingly, it is desirable to provide methods and systems that allow for retail custom footwear components to be used in conjunction with standard off-the-shelf shoes.

For example, consumers may go shopping for shoes in a shoe store (i.e., any store that sells shoes, regardless of what else is sold in addition to shoes). After selecting a shoe and before checking out, the store customer may have their feet scanned, for example, in a store kiosk. The scan provides dimensions for the store customer's foot, including dimensions of the arch area of the foot. While the customer waits (e.g., 5-10 minutes), a computer system in the kiosk may create a three dimensional virtual model of the customer's foot, compare the virtual model with dimension information of the selected shoe (e.g., based on the last used to build the selected shoe), define a shape customized to the difference between the customer's foot and the selected shoe, and 3D print footwear components having the defined shape. The footwear components may be attached to an insole and inserted into the shoes, thus customizing the selected shoe. The customer may then check out of the store with a customized article of footwear without the extensive waiting normally associated with a custom-made product.

The methods and systems disclosed herein are not limited to use in a shoe store. For example, a kiosk may be provided that is not associated with a store and a user may bring a pair of shoes to be customized (e.g., a pair of shoes already owned by the user). While the retail setting is specifically discussed by way of example, in some embodiments, other settings, such as a doctor's office, are also possible. Moreover, while a kiosk is used in some embodiments, a kiosk is not necessary to use the methods and systems disclosed herein. Thus, locations other than a store or a kiosk are possible.

Figure 1:
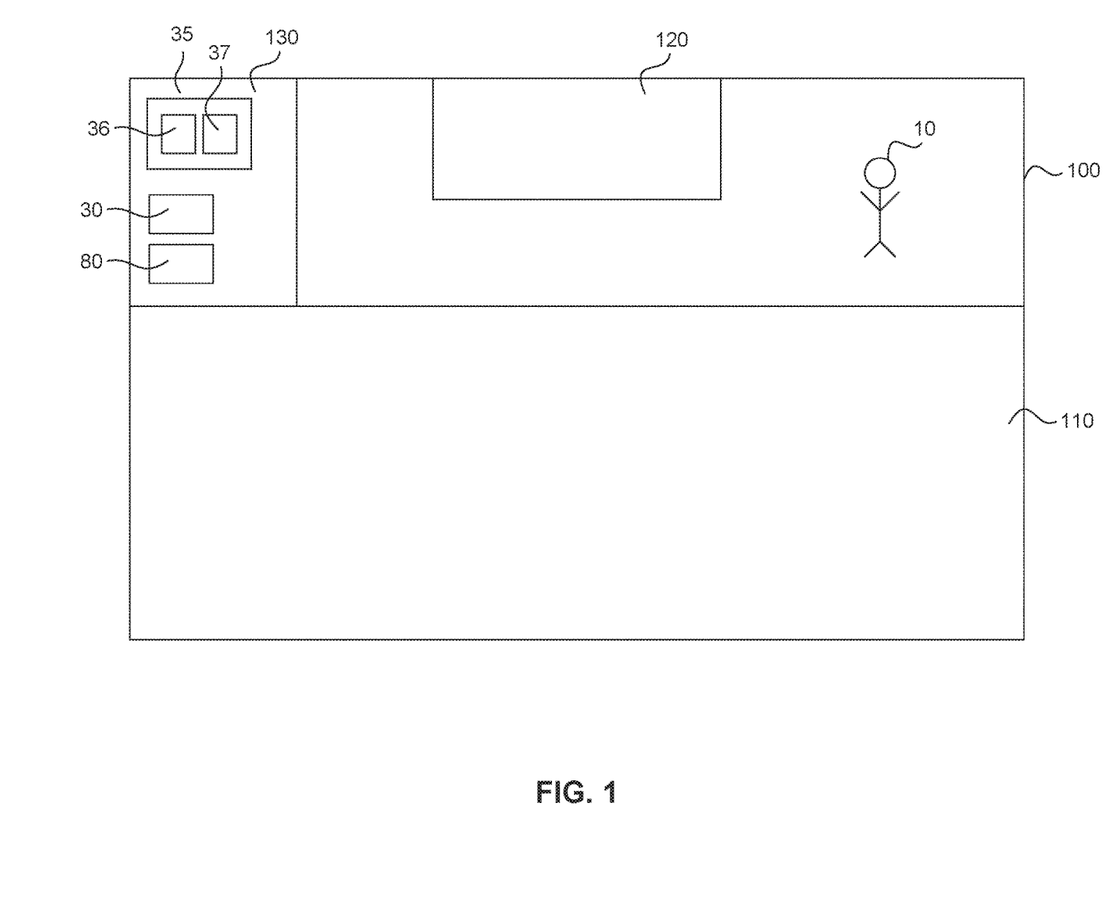
FIG. 1 shows a schematic view of a location for creating retail custom footwear components according to some embodiments.
Figure 2:
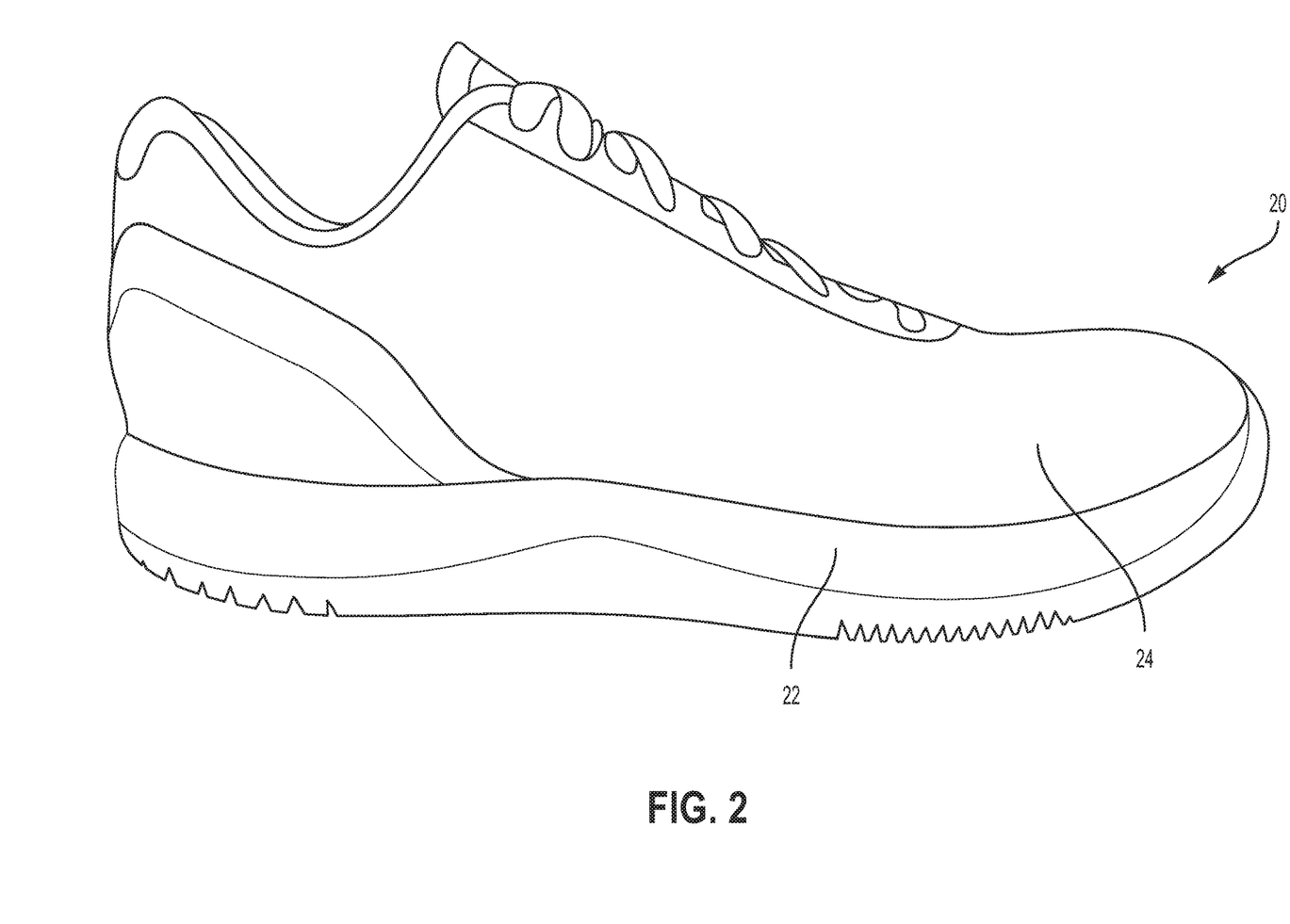
FIG. 2 shows an article of footwear to be customized by creating retail custom footwear components according to some embodiments.

A location for creating retail custom footwear components, such as store 100 (e.g., a shoe store), as shown, for example, in FIG. 1, may include a product selection area 110 and a checkout area 120. In some embodiments, a variety of articles of footwear 20 (as shown, for example, in FIG. 2) may be displayed in product selection area 110, such as on shelves, product stands, or other display structures. In some embodiments, article of footwear 20 comprises a shoe for sale, for example, in store 100. While only one article of footwear 20 is shown in FIG. 2, it is to be understood that articles of footwear 20 come in pairs and the embodiments discussed below apply to each article of footwear 20 of a pair (i.e., left and right shoes). In some embodiments, article of footwear 20 comprises a sole 22 and an upper 24. While only one type of sole 22 and one type of upper 24 is shown in FIG. 2, articles of footwear 20 may include shoes of various brands, styles, colors, sizes, etc., that come with different types of soles 22 and different types of uppers 24. Any sole 22 and any upper 24 may be utilized in connection with embodiments disclosed herein. In other words, a customer 10 may select any article of footwear 20 from product selection area 110 to be purchased and/or customized using the methods and/or systems disclosed herein.

In some embodiments, checkout area 120 comprises a point of purchase for customer 10 to purchase article of footwear 20. Customer 10 may select article of footwear 20 from product selection area 110 and directly purchase article of footwear 20 at checkout area 120 (i.e., without customizing article of footwear 20). However, customer 10 may desire to customize article of footwear 20 prior to purchasing article of footwear 20 at checkout area 120.

Figure 3:
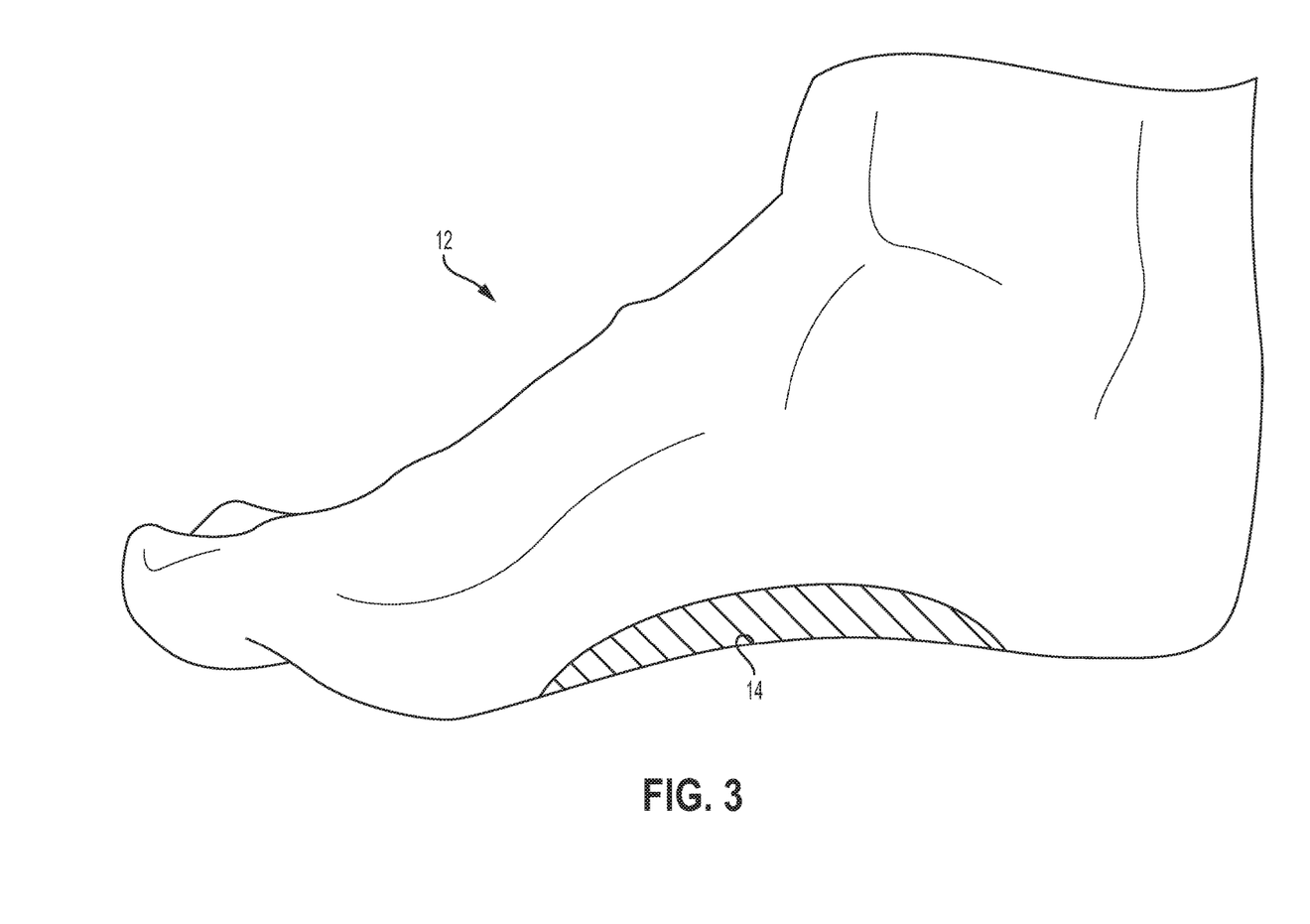
FIG. 3 shows a foot of a customer for creating retail custom footwear components according to some embodiments.

In some embodiments, store 100 includes a customization area 130. In some embodiments, customization area 130 is configured to measure a foot 12 (see FIG. 3) of customer 10, compare the dimensions of foot 12 with article of footwear 20 selected by customer 10, and create a custom footwear component, such as an arch support 82 (see FIG. 9), configured to customize article of footwear 20. In some embodiments, customization area 130 comprises a kiosk within store 100. In some embodiments, customization area 130 includes a scanner 30, a computer system 35, and a 3D printer 80. In some embodiments, computer system 35 comprises a database 36 and a user interface 37. In some embodiments, customer 10 may select article of footwear 20 from product selection area 110, customize article of footwear 20 at customization area 130, and then purchase customized article of footwear 20 at checkout area 120. This may allow customer 10 to purchase an off-the-shelf article of footwear 20 that is customized to particularly fit customer's foot 12 without the typical cost and wait of a custom-made shoe.

While a variety of footwear components may be created, in some embodiments, arch support 82 is created, as described in more detail below. Foot 12, as shown, for example, in FIG. 3, includes a medial longitudinal arch 14. However, the size and shape of arch 14 varies from person to person, thus making it difficult for a standard off-the-shelf article of footwear 20, as shown, for example, in FIG. 2, to provide an optimal fit for each individual of a particular shoe size. In some embodiments, the dimensions of foot 12, including the dimensions of arch 14, may be used to customize article of footwear 20.

Figure 4:
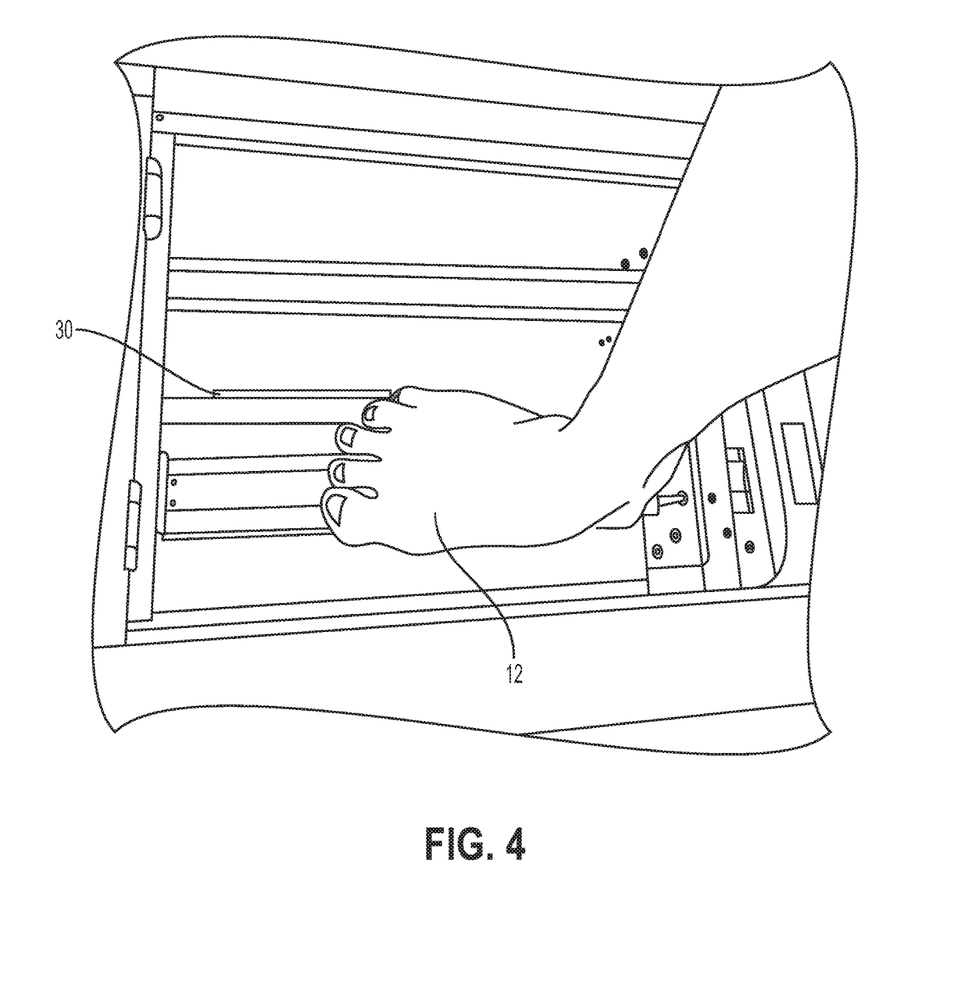
FIG. 4 shows a scanner for creating retail custom footwear components according to some embodiments.

In some embodiments, the dimensions of foot 12 may be obtained in customization area 130. In some embodiments, the dimensions of foot 12 may be obtained by use of a ruler, a tape measure, a Brannock Device, a Bio-Foam Impression box, or other device. In some embodiments, the dimensions of foot 12 may be obtained by scanning foot 12 with scanner 30, as shown in FIG. 4. In some embodiments, scanner 30 comprises a 3D scanner. In some embodiments, the raw scan data from scanner 30 comprises one or more point clouds. In some embodiments, the raw scan data may be saved in one data format (e.g., binary FBD data format consisting of foot form point clouds and landmark positions) and may be converted to other formats (e.g., CSV, STL, etc.). For example, the data may be exported from scanner 30 by a file converter into a different format. In some embodiments, scanner 30 is operably connected to computer system 35. In some embodiments, computer system 35 comprises user interface 37. In some embodiments, user interface 37 comprises a display screen. In some embodiments, computer system 35 is part of scanner 30. Thus, in some embodiments, scanner 30 comprises user interface 37 (e.g., a display screen).

Figure 5:
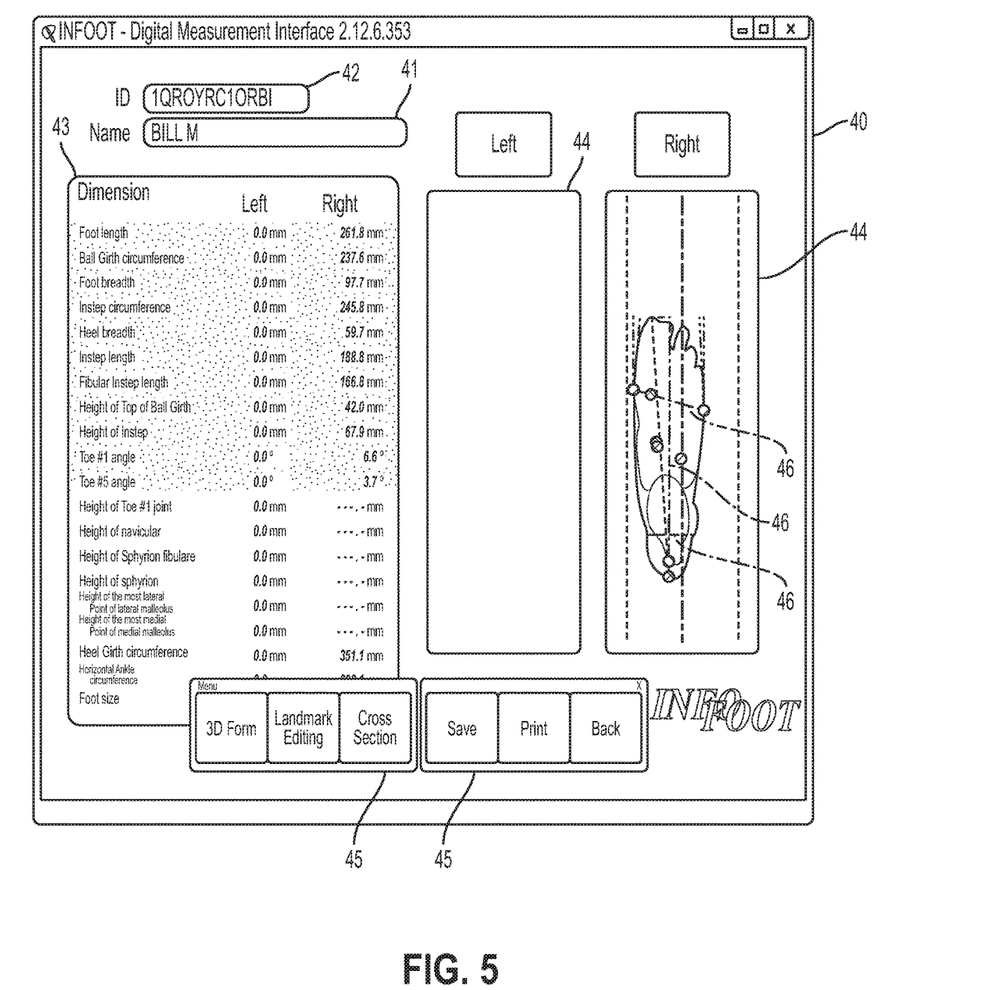
FIG. 5 shows a display for creating retail custom footwear components according to some embodiments.

In some embodiments, the display screen is configured to display information associated with the scan of foot 12. For example, a display 40, as shown in FIG. 5, displays information associated with the scan of foot 12. In some embodiments, display 40 includes a user information field 41, an identification information field 42, a foot dimension field 43, a foot model field 44, and/or user input controls 45.

In some embodiments, user information field 41 displays the name of customer 10 being scanned. In some embodiments, each customer 10 may have a profile associated with them. For example, the profile may be created the first time customer 10 is scanned. In some embodiments, profiles of customers 10 are stored in database 36. In some embodiments, a profile may include details from previous scans. Storing these details in a profile for each customer 10 may save time in future purchases, although customer 10 may elect to re-scan customer's foot 12 at any time.

In some embodiments, identification information field 42 displays an identification code associated with the scan results being shown. For example, each scan may have a unique identification code, which may consist of a series of letters and/or numbers.

In some embodiments, foot dimension field 43 displays dimensions of customer's foot 12 based on the scan. In some embodiments, the dimensions may include the following types of dimensions: foot length, ball girth circumference, foot breadth, instep circumference, heel breadth, instep length, fibulare instep length, height of top of ball girth, height of instep, toe #1 angle, toe #5 angle, toe #1 height, toe #5 height, height of navicular, height of sphyrion fibulare, height of sphyrion, height of the most lateral point of lateral malleolus, height of the most medial point of medial malleolus, medial arch length, angle of heel bone, heel girth circumference, horizontal ankle circumference, calf circumference, heel—navicular length, horizontal distance: lateral malleolus—Achilles tendon, horizontal distance: medial malleolus—Achilles tendon, horizontal distance: center point of lateral and medial malleolus—Achilles tendon, sphyrion—heel length; sphyrion fibulare—heel length, and/or foot size. These dimensions are provided by way of example. Other dimensions may also be determined and displayed on display 40. In some embodiments, dimensions are provided for each of the left foot and the right foot. The dimensions may be displayed in either metric units (e.g., millimeters, as in FIG. 5) or in imperial units (e.g., inches).

In some embodiments, foot model field 44 displays a model of customer's foot 12 based on the scan. In some embodiments, foot model field 44 includes a model of customer's right and left feet 12. In some embodiments, the model of customer's foot 12 comprises a 3D model. In some embodiments, foot model field 44 displays an orthogonal view (e.g., top view, bottom view, side view, etc.) of the model of customer's foot 12. In some embodiments, foot model field 44 displays indications 46 of foot dimensions. For example, indications 46 may be overlaid on the model of customer's foot 12. In some embodiments, indications 46 comprise a line between two points (i.e., landmarks) that show how a certain dimension is being measured. For example, FIG. 5 shows indication 46 that extends along a longitudinal axis from the heel of the model of customer's foot 12 to the toe that extends the farthest. This indication 46 facilitates a review of the scan to check that the foot length is accurately being measured.

In some embodiments, user input controls 45 allow a user (e.g., customer 10, store employee, operator, etc.) to perform different functions with display 40. In some embodiments, user input controls 45 comprise icons on a touch screen. In some embodiments, user input controls 45 comprise buttons to edit the view of display 40. For example, user input controls 45 may include a button to change the form of the model of customer's foot 12, such as changing the view to a 3D model, as shown, for example, in FIG. 6, or changing the view to a cross section view. In some embodiments, user input controls 45 may include a button to edit landmarks (i.e., the points that define a certain dimension, such as the rearmost point of foot 12), which may assist a user in ensuring accurate measurements. In some embodiments, user input controls 45 comprise a save button to save the current display 40, a print button to print the current display 40, and a back button to undo the last operation.

Figure 6:
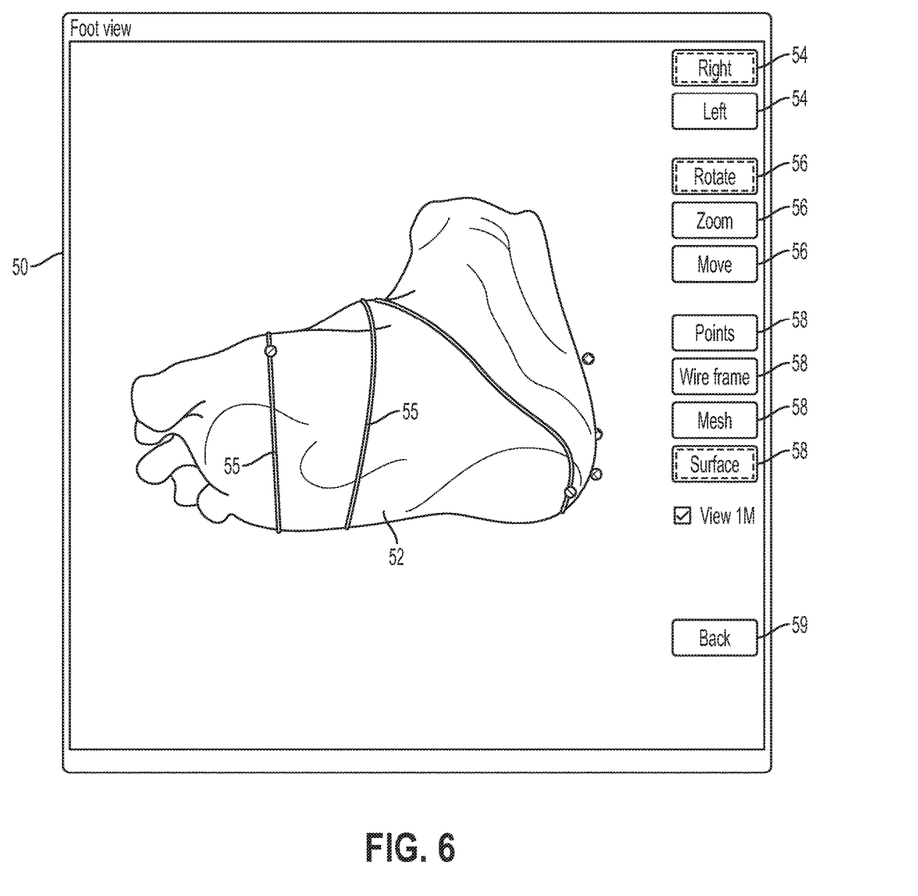
FIG. 6 shows a display for creating retail custom footwear components according to some embodiments.

In some embodiments, the display screen is configured to display a 3D model of customer's foot 12. For example, a display 50, as shown in FIG. 6, displays a virtual 3D model 52 of customer's foot 12. In some embodiments, a user may manipulate the view of the virtual 3D model 52.

In some embodiments, display 50 comprises foot selection buttons 54. In some embodiments, foot selection buttons 54 are selected to toggle between a view of virtual 3D model 52 of customer's left foot 12 and a view of virtual 3D model 52 of customer's right foot 12. Similar to display 40, display 50 may include indications 55 of foot dimensions.

In some embodiments, display 50 comprises movement selection buttons 56. In some embodiments, movement selection buttons 56 are selected to toggle between different types of view movement, such as rotate, zoom, and pan. For example, after selecting the movement selection button 56 for rotate, a user may rotate (for example, with a computer mouse or keyboard) the view of virtual 3D model 52 to view the customer's foot 12 from different angles. Similarly, after selecting the movement selection button 56 for zoom, a user may zoom into certain parts of virtual 3D model 52, and after selecting the movement selection button 56 for pan, a user may move virtual 3D model 52 up, down, left, or right to view certain parts of virtual 3D model 52.

In some embodiments, display 50 comprises model selection buttons 58. In some embodiments, model selection buttons 58 are selected to toggle between different types of model views of virtual 3D model 52. For example, virtual 3D model 52 may be viewed via wire frame, mesh, point, or surface model views, or a combination of these types of views.

In some embodiments, display 50 comprises a back button 59. In some embodiments, back button 59 may undo the last operation. In some embodiments, back button 59 may return to a previous screen (e.g., display 40).

In some embodiments, displays 40 and 50 allow a user to both view the dimension results from the scan and also review these results to be sure the customer's foot 12 was accurately captured. In some embodiments, these results may be stored in database 36. Thus, when customer 10 returns to purchase another article of footwear, the information from the previous scan is already available.

In some embodiments, after both of customer's feet 12 have been scanned and foot dimensions obtained, computer system 35 compares the foot dimensions with the dimensions of the selected article of footwear 20 (i.e., shoe dimensions). In some embodiments, the shoe dimensions are stored in database 36. For example, the shoe dimensions may be provided by the manufacturer of each article of footwear. In some embodiments, the shoe dimensions may be based on a last 60, as shown, for example, in FIG. 7, that is used to build the selected article of footwear 20. In some embodiments, each last 60 is associated with a shoe size 62 for the selected article of footwear 20. Thus, in some embodiments, a user inputs the selected article of footwear 20 (i.e., brand, model, etc.) and its shoe size 62. In some embodiments, the user manually types this information into computer system 35. In some embodiments, the user selects this information in computer system 35 (e.g., in a drop down list). In some embodiments, article of footwear 20 may include a tag that can be scanned to provide this information (e.g., an RFID tag).

Figure 7:
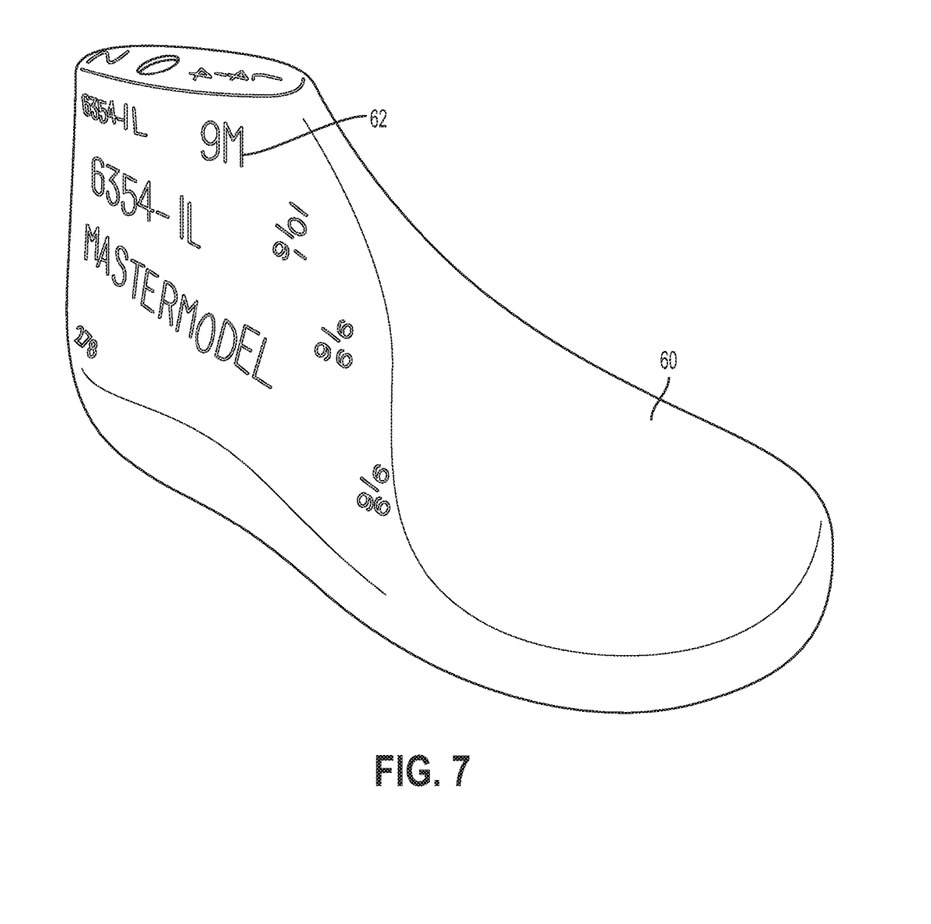
FIG. 7 shows a shoe last for creating retail custom footwear components according to some embodiments.

In some embodiments, computer system 35 compares the dimensions of customer's foot 12 with pre-determined dimensions of the selected article of footwear 20. In some embodiments, computer system 35 compares the dimensions of customer's foot 12 with pre-determined dimensions of last 60 used to make the selected article of footwear 20. In some embodiments, computer system 35 compares the dimensions of customer's foot 12 with the dimensions of last 60 in an arch area. In some embodiments, the foot dimensions and last dimensions are compared by comparing virtual 3D model 52 of customer's foot 12 with a virtual 3D model of last 60.

Figure 8:
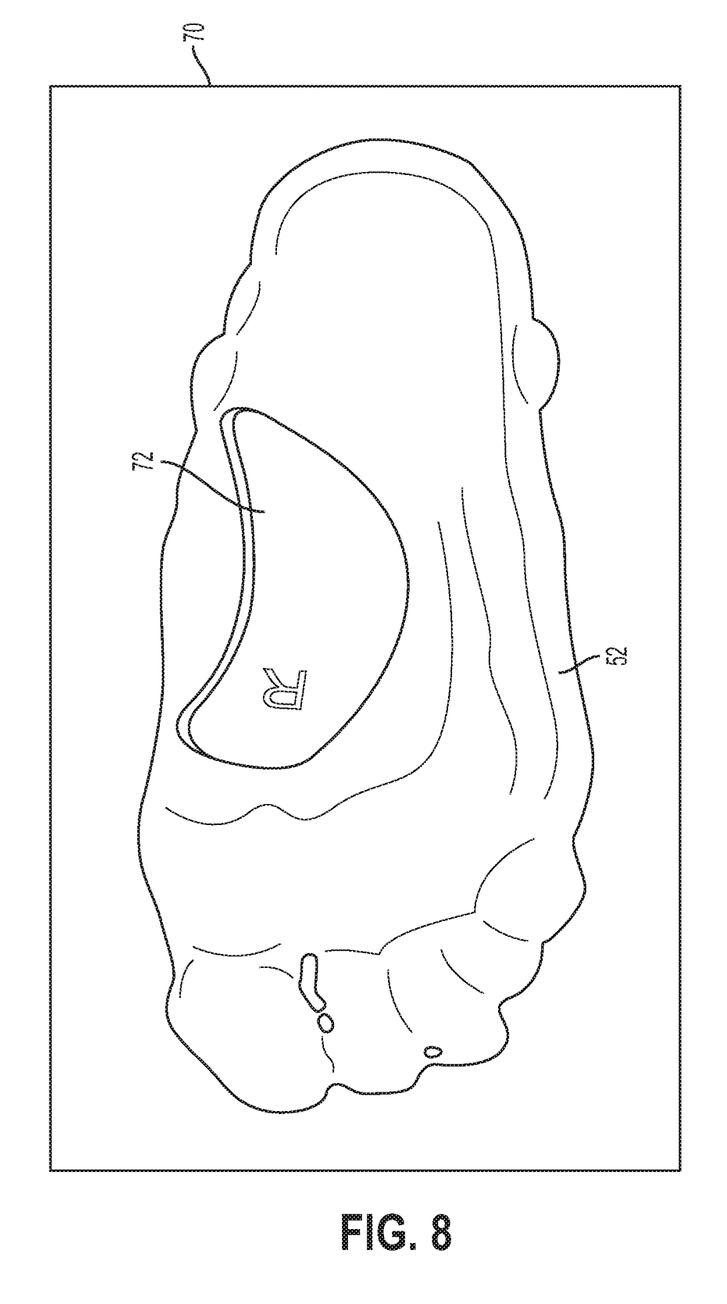
FIG. 8 shows a representation of a desired shape for retail custom footwear components according to some embodiments.

In some embodiments, computer system 35 defines a shape 72 characterized by the difference between the dimensions of customer's foot 12 and the dimensions of article of footwear 20 (or last 60). In some embodiments, the display screen of user interface 37 may provide display 70 that shows shape 72 with virtual 3D model 52, as shown, for example, in FIG. 8.

Figure 9:
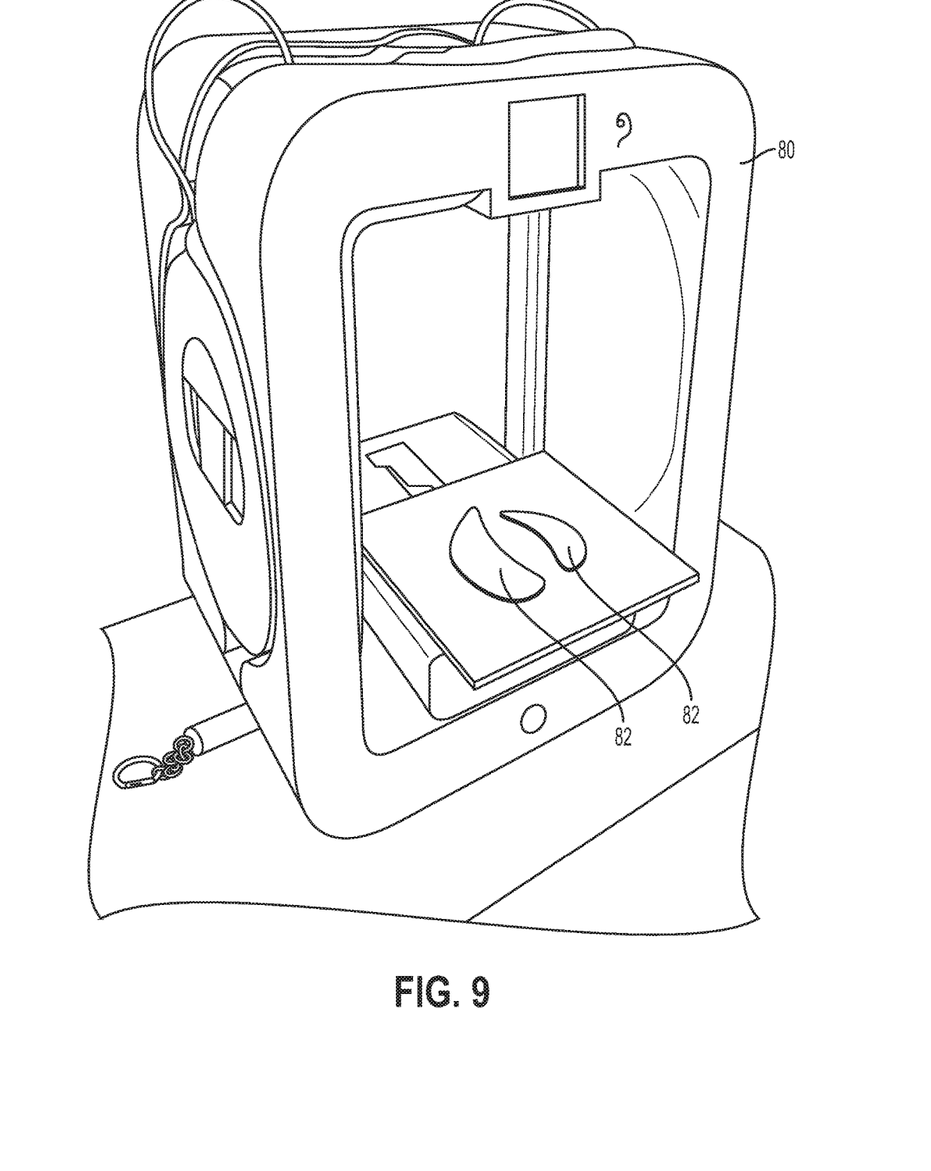
FIG. 9 shows a 3D printer for creating retail custom footwear components according to some embodiments.

In some embodiments, a footwear component, such as arch support 82, may be created based on shape 72. For example, arch support 82 may have the shape 72. In some embodiments, 3D printer 80, as shown, for example, in FIG. 9, is operably connected to computer system 35. In some embodiments, 3D printer 80 prints arch support 82. In some embodiments, 3D printer 80 prints arch support 82 in less than ten minutes (e.g., one to five minutes). In some embodiments, 3D printer 80 is also configured to print a 3D model of customer's foot 12.

Figure 10:
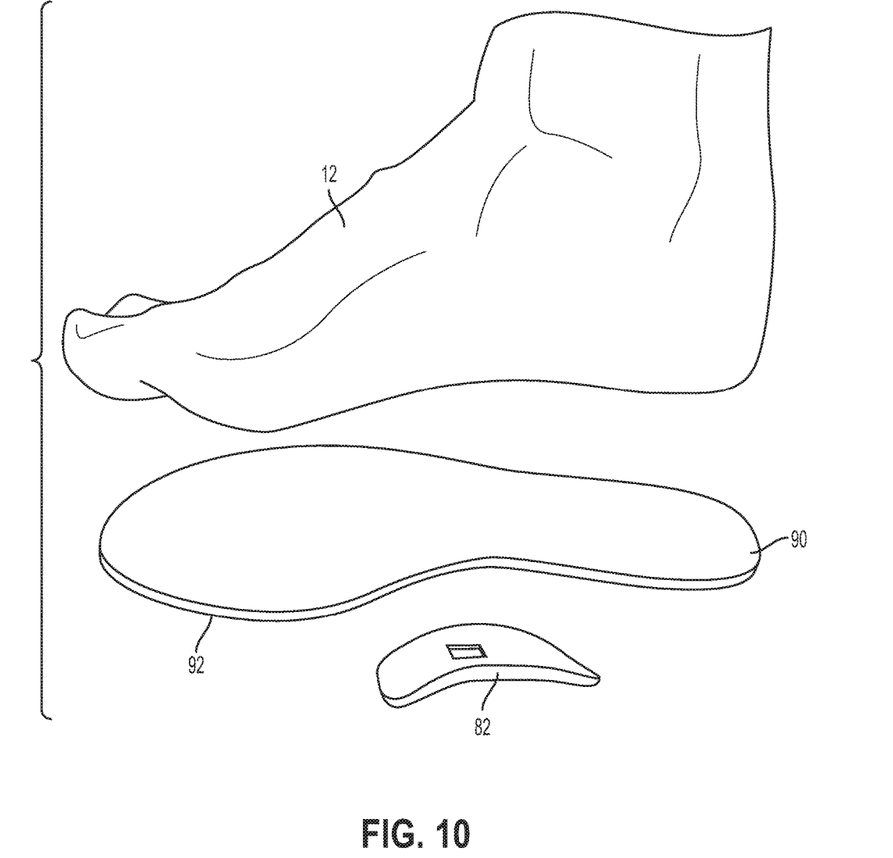
FIG. 10 shows an assembly view of retail custom footwear components according to some embodiments.

In some embodiments, arch support 82 may be attached to an insole 90, as shown, for example, in FIG. 10. In some embodiments, insole 90 is flat. In some embodiments, arch support 82 may be attached to a bottom surface 92 of insole 90. In some embodiments, arch support 82 may be attached to other parts of insole 90, such as the top surface. In some embodiments, arch support 82 may be embedded within insole 90. In some embodiments, arch support 82 is attached to insole 90 via an adhesive.

In some embodiments, arch support 82 and insole 90 are inserted into article of footwear 20. In some embodiments, arch support 82 and insole 90 form a custom footbed. In some embodiments, article of footwear 20 with arch support 82 and insole 90 dispose therein form a cavity that optimally fits customer's foot 12. At this point, customer 10 may purchase customized article of footwear 20 at checkout area 120.

Figure 11:
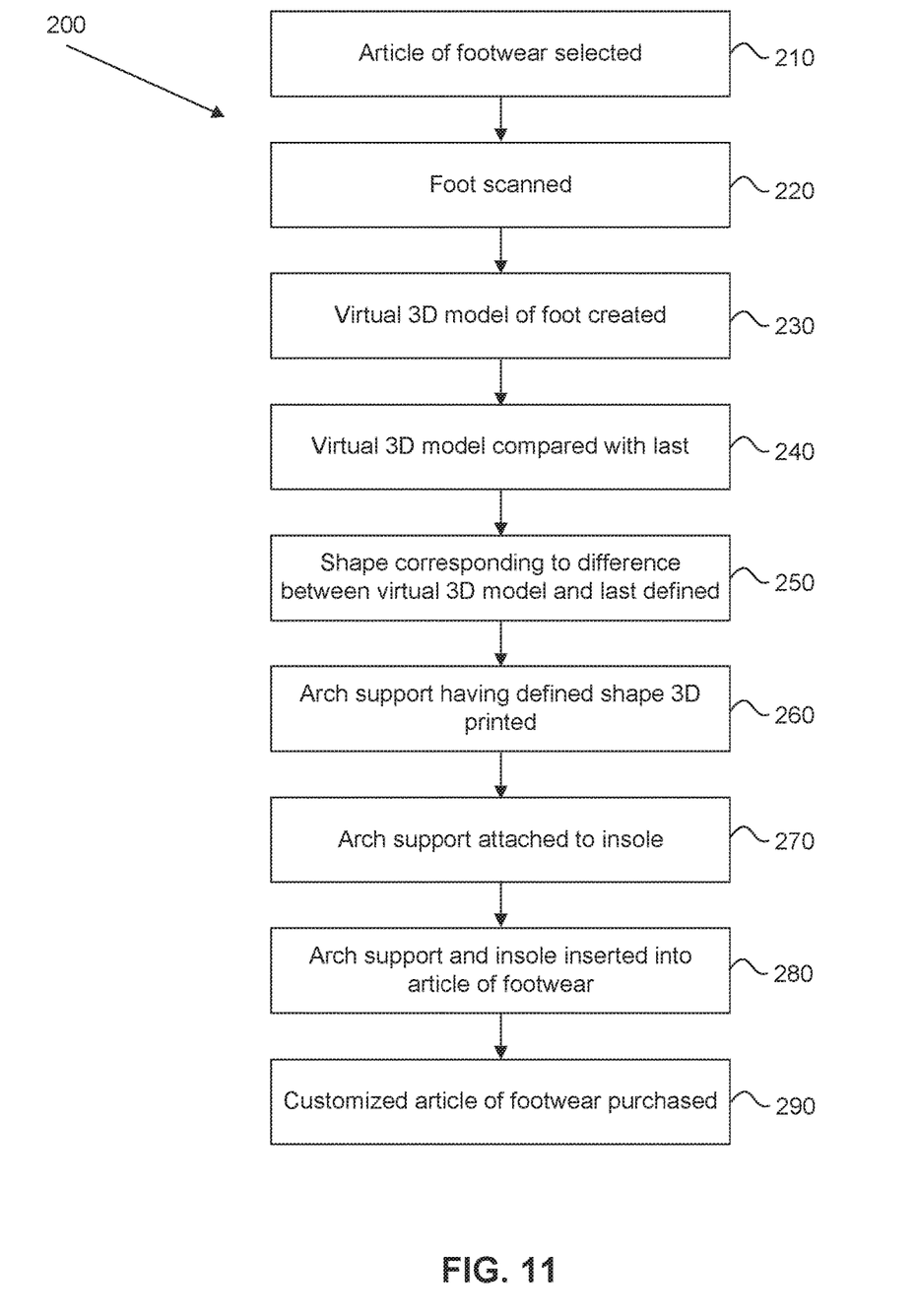
FIG. 11 shows a method for customizing articles of footwear by creating retail custom footwear components according to some embodiments.

A method 200 for customizing articles of footwear by creating retail custom footwear components is shown, for example, in FIG. 11. While a particular order is shown for the operations in FIG. 11, the operations may be done in a different order in some embodiments. In addition, in some embodiments, additional operations may be done. Finally, in some embodiments, not every operation is done.

In some embodiments, at operation 210, customer 10 selects an article of footwear 20. In some embodiments, article of footwear 20 is selected from product selection area 110 of store 100. In some embodiments, article of footwear 20 comprises a shoe that is already owned by customer 10.

In some embodiments, at operation 220, customer's feet 12 are scanned. In some embodiments, customer's feet 12 are scanned at a kiosk or other customization area 130. In some embodiments, customer's feet 12 are scanned prior to customer 10 selecting article of footwear 20 (e.g., as customer 10 enters store 100 or during a previous visit to store 100 when customer 10 purchased a different article of footwear 20). In some embodiments, instead of scanning customer's foot 12, the dimensions of customer's foot 12 may be obtained using different methods (e.g., measuring with a cloth tape measure).

In some embodiments, at operation 230, virtual 3D model 52 of customer's foot 12 is created. In some embodiments, virtual 3D model 52 is created for customer's left and right feet 12. In some embodiments, computer system 35 is utilized to create virtual 3D model 52, as discussed above. In some embodiments, a user manipulates virtual 3D model, if necessary to alter the dimensions obtained from the scanning process.

In some embodiments, at operation 240, virtual 3D model 52 is compared with last 60 used to build the selected article of footwear 20. In some embodiments, this comparison is done by comparing the dimensions of virtual 3D model 52 (i.e., the dimensions of customer's foot 12) with the dimensions of a virtual 3D model of last 60. As discussed above, the last dimensions and/or shoe dimensions may be provided by a manufacturer of article of footwear 20. In some embodiments, the last dimensions and/or shoe dimensions may be stored in database 36. In some embodiments, database 36 itself may be provided by the manufacturer of article of footwear 20.

In some embodiments, at operation 250, shape 72 corresponding to the difference between virtual 3D model 52 and last 60 is defined. In some embodiments, shape 72 is associated with a region of arch 14 of customer's foot 12.

In some embodiments, at operation 260, arch support 82 having defined shape 72 is 3D printed (e.g., with 3D printer 80). In some embodiments, arch support 82 may be created using methods other than 3D printing. Other footwear components may be created instead of or in addition to arch support 82 using 3D printing or other methods.

In some embodiments, at operation 270, arch support 82 is attached to insole 90. In some embodiments, arch support 82 may be adhered to insole 90 with an adhesive. In some embodiments, arch support 82 is attached to bottom surface 92 of insole 90. In some embodiments, insole 90 is the insole already provided within article of footwear 20.

In some embodiments, at operation 280, arch support 82 and insole 90 are inserted into article of footwear 20. In some embodiments, arch support 82 and insole 90 together form a custom footbed that is optimally shaped to support customer's foot 12 within article of footwear 20.

In some embodiments, at operation 290, customer 10 purchases customized article of footwear 20. In some embodiments, customer 10 purchases customized article of footwear 20 at checkout area 120. In some embodiments, customer 10 purchases customized article of footwear 20 directly at customization area 130.

In some embodiments, operations 220, 230, 240, 250, 260, 270, and 280 may take less than ten minutes collectively. For example, customer 10 may have a customized article of footwear 20 five or ten minutes after selecting article of footwear 20.

Various embodiments described herein allow for a customized article of footwear with reduced cost and wait times than a typical custom-made shoe. The customized article of footwear is optimally fit to the customer's foot to provide the proper support. Thus, retailers may provide off-the-shelf shoes in standard shoe sizes, yet offer customized shoes in a quick and efficient manner to those customers desiring a more optimal fit.

As noted above, in some embodiments, instead of or in addition to arch support 82, customization area 130 may be used to create other footwear components (e.g., in a heel region or a toe region) that customize article of footwear 20 to provide a more optimal fit to the customer's foot 12. Further variations of the embodiments described above may also be provided.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of making an arch support for an article of footwear at a kiosk, the method comprising:
   scanning a foot of a customer who has selected a shoe for purchase;
   determining dimensions of the customer's foot based on the scan;
   creating a three dimensional virtual model of the customer's foot based on the determined dimensions;
   providing a three dimensional virtual model of a last used to make the selected shoe having pre-determined dimensions;
   comparing the dimensions of the customer's foot with the pre-determined dimensions of the last used to make the selected shoe;
   defining a shape characterized by the difference between the dimensions of the customer's foot and the dimensions of the last; and
   printing the arch support with a 3D printer, the arch support having the shape characterized by the difference between the dimensions of the customer's foot and the dimensions of the last;
   wherein the step of comparing the dimensions of the customer's foot with the pre-determined dimensions of the last further comprises comparing the three dimensional virtual model of the customer's foot with the three dimensional virtual model of the last used to make the selected shoe.

2. The method of claim 1, further comprising:
   printing a three dimensional model of the customer's foot with the 3D printer.

3. The method of claim 1, wherein the arch support is printed in less than ten minutes.

4. The method of claim 1, wherein the dimensions of the customer's foot comprise foot length, ball girth circumference, foot breadth, instep circumference, heel breadth, instep length, fibular instep length, height of top of ball girth, height of instep, and toe angles.

5. The method of claim 1, wherein the dimensions of the last are provided by a manufacturer of the selected shoe and stored in a database.

6. The method of claim 1, wherein comparing the dimensions of the customer's foot with the dimensions of the last comprises comparing the dimensions of the customer's foot with the dimensions of the last in an arch area.

7. A method of providing a customized article of footwear, the method comprising:
   obtaining foot dimensions of a customer at a kiosk;

creating a three dimensional virtual model of a customer's foot based on the obtained foot dimensions;

providing a three dimensional virtual model of a last used to make an article of footwear selected by the customer, the article of footwear having pre-determined dimensions;

comparing the foot dimensions with the pre-determined dimensions of the article of footwear selected by the customer;

3D printing a customized arch support having a shape that matches a difference between the foot dimensions and the dimensions of the selected article of footwear;

attaching the customized arch support to a flat insole; and inserting the flat insole and the customized arch support into the selected article of footwear;

wherein the step of comparing the foot dimensions with the pre-determined dimensions of the article of footwear further comprises comparing the three dimensional virtual model of the customer's foot with the three dimensional virtual model of the last used to make the selected article of footwear.

8. The method of claim 7, wherein the customized arch support is attached to a bottom surface of the flat insole.

9. The method of claim 7, wherein the customized arch support and the flat insole form a custom footbed within the article of footwear.

10. The method of claim 7, wherein obtaining the foot dimensions of the customer comprises measuring the customer's foot with a 3D scanner.

11. The method of claim 7, wherein the dimensions of the article of footwear are stored in a database provided by a manufacturer of the article of footwear.

12. The method of claim 7, wherein the customized arch support is attached to the flat insole via an adhesive.

13. A system for customizing an article of footwear, the system comprising:

a 3D scanner configured to scan a foot of a customer;

a database containing shoe dimension information of shoes offered for sale, the shoe dimension information comprising a three dimensional virtual model of a last used to build the shoe having pre-determined dimensions;

a computing device configured to determine foot dimension information based on the scan of the foot, compare the foot dimension information with shoe dimension information of a shoe selected by the customer, and define a shape characterized by the difference between the foot dimension information and the shoe dimension information of the shoe selected by the customer; and a 3D printer configured to print an arch support having the shape characterized by the difference between the foot dimension information and the shoe dimension information of the shoe selected by the customer, wherein the arch support is configured to be attached to an insole and inserted within the shoe to make a customized article of footwear, wherein the computing device is configured to compare the foot dimension information with shoe dimension information by:
(i) creating a three dimensional virtual model of the customer's foot based on the scan of the foot,
(ii) accessing the three dimensional virtual model of the last used to build the selected shoe from the database, and
(iii) comparing the three dimensional virtual model of the customer's foot with the three dimensional virtual model of the last used to build the selected shoe.

14. The system of claim 13, wherein the 3D scanner and the 3D printer are located in a kiosk.

15. The system of claim 13, further comprising a display screen configured to display the foot dimension information.

16. The system of claim 13, wherein the 3D printer is configured to print a three dimensional model of the foot.

* * * * *